United States Patent
Parris

[15] 3,696,759
[45] Oct. 10, 1972

[54] TIE-DOWN FITTING

[72] Inventor: Peter P. Parris, Tustin, Calif.

[73] Assignee: Tridair Industries, Redondo Beach, Calif.

[22] Filed: March 9, 1970

[21] Appl. No.: 17,659

[52] U.S. Cl...........105/369 A, 105/368 T, 248/361 A, 280/179 A
[51] Int. Cl.............................B60p 7/08, B61d 45/00
[58] Field of Search ...105/369 A, 368 T; 280/179 A; 248/119, 361 A; 85/8.8; 287/100

[56] References Cited

UNITED STATES PATENTS

| 3,282,229 | 11/1966 | Elsner | 105/369 A |
| 3,412,692 | 11/1968 | Evans | 105/369 A |
| 2,487,802 | 11/1949 | Heimann | 85/8.8 |
| 2,755,698 | 7/1956 | Wurzel | 85/8.8 |
| 2,962,245 | 11/1960 | Molzan et al. | 105/369 A |
| 3,300,171 | 1/1967 | Watts | 105/369 A |
| 3,340,760 | 9/1967 | Wormser | 85/8.8 |
| 3,431,809 | 3/1969 | Frailly | 85/8.8 |
| 3,409,264 | 11/1968 | Schwiebert et al. | 105/368 T |

*Primary Examiner*—Drayton E. Hoffman
*Attorney*—Arthur W. Fuzak and Thomas A. Seeman

[57] ABSTRACT

A tie-down fitting having a removable pin that passes through an attachment loop formed in the end of a tie-down strap so that the tie-down can be replaced in the field without cutting the loop or without cutting and resewing the stitching in the loop.

2 Claims, 5 Drawing Figures

PATENTED OCT 10 1972  3,696,759

INVENTOR:
PETER P. PARRIS

BY: Donald J. Ellingsburg

TIE-DOWN FITTING

BACKGROUND OF THE INVENTION

Cargo carried by certain cargo carriers, such as aircraft, trucks, boats, and the like, can be secured by passing suitable tie-down straps over the cargo. Tie-down fittings attached to the strap ends removably engage track fittings which can be positioned on cargo pallets, in the support surface of the carrier, and the like.

The tie-down fittings are attached to the strap ends by passing a strap end through a ring or around a fixed pin, folding the strap end back on itself, and sewing or otherwise securing the strap end to the strap body thereby forming a strap end loop permanently attached to the tie-down fitting. If the tie-down fitting is damaged, which can frequently happen from improper loading or from overloading, the stitching of the loop must be cut to open the loop and remove the damaged fitting. The loop must then be restitched with a new fitting in place. Since the stitching requires special stitching patterns to develop the necessary load requirements, the restitching cannot be easily completed in the field but must be returned to a special repair facility capable of completing the required stitching. The lost time for repair and the non-use of the cargo tie-down straps during the repair becomes costly when consideration is given to the numbers of such fittings-and-strap end combinations currently in use.

OBJECTS OF THE INVENTION

Accordingly, it is an object of the invention to provide a new and improved tie-down fitting that facilitates replacement of the tie-down fitting.

It is an object of the invention to provide a tie-down fitting that permits field repair of damaged tie-down fittings without opening or otherwise weakening a tie-down strap end loop.

It is an object of the invention to provide a tie-down fitting that has a minimal number of parts yet with a relatively high strength ratio.

SUMMARY OF THE INVENTION

Briefly, in accordance with one form of the invention, a new and improved tie-down fitting having a removable pin is provided where the smooth pin passes through a pair of spaced uprights and a strap end loop positioned between the uprights and is retained therein by a suitable retaining ring that engages the pin and constantly urges the pin into engagement with one of the uprights by acting upon the other of the uprights. The ring is selectively removable so that the pin can be removed for replacement or repair of the tie-down fitting.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

DESCRIPTION OF THE INVENTION

Figure 1:
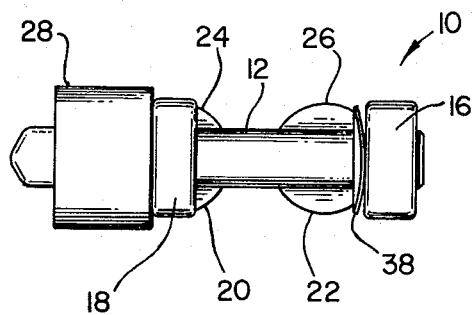
FIG. 1 is a plan view of the tie-down fitting of the invention.
Figure 2:
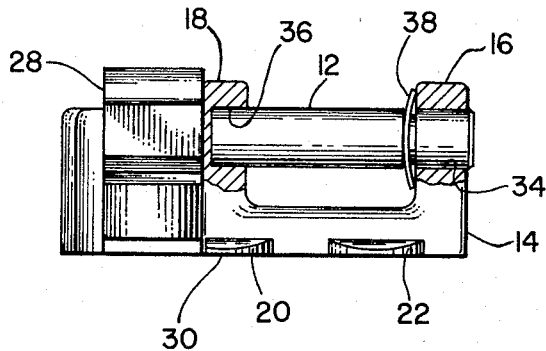
FIG. 2 is an elevation view, partly broken away, of the tie-down fitting of FIG. 1.
Figure 3:
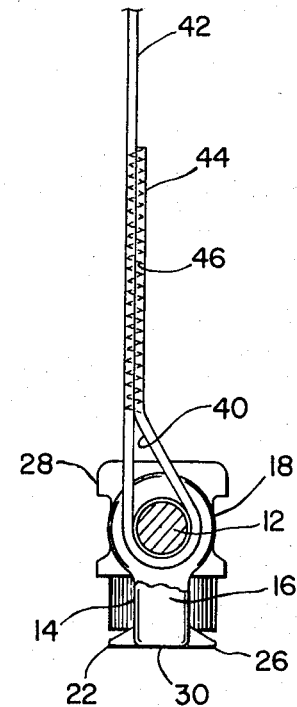
FIG. 3 is an end view of the tie-down fitting of FIG. 1 in engagement with a tie-down strap end loop.

One form of tie-down fitting 10 with a removable pin 12 is shown by FIGS. 1-3. The tie-down fitting has a longitudinally extending body portion 14 with the removable pin carried by spaced upright portions 16 and 18 which define a slot therebetween. Substantially similar outwardly extending flanges 20 and 22 are paired with similar outwardly extending flanges 24 and 26, respectively, and adapted for removable engagement with a conventional track fitting (not shown, but see U. S. Pat. No. 3,282,229). A captive plunger 28 is carried by the body portion 14 and movable perpendicular to the plane surface 30, which is preferably coplanar with the plane surfaces of the flanges 20, 22, 24 and 26, to engage the track fitting. The plunger 28 can be spring-biased toward the plane surface 30.

Figure 5:
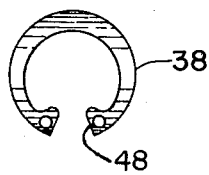
FIG. 5 is a plan view of one form of retaining ring useable with the tie-down fitting of FIG. 1.
Figure 4:
FIG. 4 is a plan view of the removable pin of the tie-down fitting of FIG. 1.

The removable pin 12 is a smooth, elongated pin, as shown by FIG. 4, defining a longitudinal pin axis. The pin 12 has an annular groove 32 suitably formed so that in the embodiment illustrated the groove is adjacent the upright pin support portion 16 and intermediate the portions 16 and 18. The pin 12 passes through a clear hole 34 in upright portion 16 and into a clear blind hole 36 in upright portion 18 so that the pin is supported in the axially-aligned holes 34 and 36 by the upright portions with the pin axis preferably coinciding with the hole axes as illustrated. It is contemplated that the blind hole 36 could also be a clear hole. A conventional retaining or snap ring 38 of an external type as shown by FIG. 5 is snapped around the pin 12 in the annular groove 32 to retain the pin in the upright portions 16 and 18. The retaining ring 38 has a spring characteristic because of its bent geometry as shown particularly by FIG. 2. The ring 38 bears against upright portion 16 and against the wall of annular groove 32 to continuously urge the pin 12 in the direction of and into the clear blind hole 36.

The pin 12 as shown by FIG. 3 removably passes through a loop 40 formed in a cargo tie-down strap 42. The loop has a strap end 44 folded back on itself and stitched to the strap 42 by stitching 46 which conforms to a predetermined stitching pattern that develops the necessary resistance to failure under specified load requirements.

If the tie-down fitting 10 is damaged or requires replacement, the retaining ring 38 can be removed by applying an external force to the split end 48 of the ring (see FIG. 5) and releasing the ring from the annular groove 32. The pin 12 can then be withdrawn from the holes 34 and 36 and, thus, from the loop 40. Upon completion of the repair of the tie-down fitting 10 or the replacement thereof, the pin 12 is replaced through the hole 34, the loop 40 and into hole 36, and the retaining ring 38 is then snapped into the annular groove 32.

It is contemplated that a suitable screw can replace the removable pin and be threaded into either one or both of the holes in the upright portions which are threaded to receive the screw. When the screw is threaded for all or a substantial portion of its total length, a sleeve can be retained by the screw between the upright portions so that a smooth sleeve surface is available to engage the strap-end loop.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:

1. A tie-down fitting for removable engagement with a track fitting and with a tie-down strap end loop, the tie-down fitting comprising:
   a. body means selectively connected in a first direction to the track fitting, said body means selectively connected in a first direction to the track fitting, said body means comprising:
   1. a longitudinally extending body portion defining a body longitudinal axis,
   2. a planar surface on said body portion extending parallel with the body portion longitudinal axis,
   3. at least first and second flanges extending outwardly in a second direction from said body portion adapted for the selective connection to the track fitting.
   4. first and second spaced apart pin-support portions extending outwardly from said body portion substantially perpendicular to said planar surface,
   5. a plunger movably connected to said body portion and displaceable for the selective connection to the track fitting,
   6. a clear hole in said first pin-support portion,
   7. a blind hole in said second pin-support portion,
   2 8. said clear and blind holes individually defining holes axes axially aligned in said spaced-apart pin-support portions,
   b a longitudinally extending pin removably positioned through said clear hole into said blind hole and defining a pin longitudinal axis oriented substantially coincidental with the axially aligned hole axes, said pin adapted for the selective engagement of the strap end loop,
   c. an annular groove suitably formed in said pin intermediate said first and second pin-support portions generally adjacent said clear hole, and
   means having a spring characteristic engaging said pin and said annular groove, said means bearing against said first pin-support portion and said annular groove and continuously urging said pin into said blind hole.

2. A tie-down fitting, according to claim 1, which includes:
   a. a split retaining ring having a spring characteristic engaging said pin and said annular groove, said ring bearing against said first pin support portion and said annular groove and continuously urging said pin into said blind hole.

* * * * *